US008009263B2

(12) United States Patent  (10) Patent No.: US 8,009,263 B2
Mi et al.  (45) Date of Patent: Aug. 30, 2011

(54) BISTABLE DISPLAY

(75) Inventors: Xiang-Dong Mi, Rochester, NY (US); Stanley W. Stephenson, III, Spencerport, NY (US)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/794,343

(22) Filed: Jun. 4, 2010

(65) Prior Publication Data
US 2010/0244325 A1  Sep. 30, 2010

Related U.S. Application Data

(62) Division of application No. 11/009,767, filed on Dec. 10, 2004.

(51) Int. Cl.
C09K 19/02 (2006.01)
(52) U.S. Cl. ............ 349/177; 349/187; 349/175
(58) Field of Classification Search ........... 349/175, 349/177
See application file for complete search history.

(56) References Cited

U.S. PATENT DOCUMENTS

| | | | |
|---|---|---|---|
| 5,220,442 A | 6/1993 | Dingwall et al. | |
| 5,695,682 A | 12/1997 | Doane et al. | |
| 5,943,067 A | 8/1999 | Kong | |
| 6,061,122 A | 5/2000 | Hoshino et al. | |
| 6,236,442 B1 | 5/2001 | Stephenson et al. | |
| 6,423,368 B1 | 7/2002 | Stephenson et al. | |
| 6,580,481 B2 | 6/2003 | Ueda et al. | |
| 6,639,637 B2 | 10/2003 | Stephenson | |
| 6,690,447 B1 | 2/2004 | Stephenson et al. | |
| 7,130,013 B2 | 10/2006 | Burberry et al. | |
| 2003/0173539 A1 | 9/2003 | Muller-Rees et al. | |
| 2003/0202136 A1 | 10/2003 | Stephenson et al. | |
| 2004/0061808 A1* | 4/2004 | Stephenson et al. | 349/2 |
| 2004/0124398 A1 | 7/2004 | Kuntz et al. | |

FOREIGN PATENT DOCUMENTS

JP  11-258759  9/1999

OTHER PUBLICATIONS

Dozov, I., *Bistable Liquid Crystal Technologies*, SID 2003, pp. 946-949.
Stephenson, S. W. III et al., *Method and Apparatus for Capturing an Image*, U.S. Appl. No. 11/009,896, filed Dec. 10, 2004.
Mi, X., *A Bistable Watermark*, U.S. Appl. No. 11/009,884, filed Dec. 10, 2004.
Mi, X. *Cholesteric Liquid Crystal Display System*, U.S. Appl. No. 10/725,241, filed Dec. 1, 2003.
Office Action from related U.S. Appl. No. 11/009,767, mailed Nov. 9, 2010.

\* cited by examiner

*Primary Examiner* — David Nelms
*Assistant Examiner* — David Chung
(74) *Attorney, Agent, or Firm* — Alston & Bird LLP

(57) ABSTRACT

A bistable display having one or more permanent hideable mark, and a method of forming the permanent hideable mark, are described. The permanent hideable mark can be hidden and revealed numerous times without loss of information.

16 Claims, 7 Drawing Sheets

PLANAR

FOCAL-CONIC

BISTABLE DISPLAY

CROSS-REFERENCE TO RELATED APPLICATIONS

This application is a divisional of U.S. application Ser. No. 11/009,767, filed Dec. 10, 2004, which is hereby incorporated herein in its entirety by reference.

FIELD OF THE INVENTION

The present invention relates to a security device including permanent hideable information that is invisible in one state, but visible in another state.

BACKGROUND OF THE INVENTION

There is an increasing need for protection against forgery of documents using copiers, scanners, and various printing techniques.

Various uses of optically variable security markings, including but not limited to diffraction gratings, holograms, interference coatings, metameric inks, and polarization coatings, have been widely adopted. These security markings vary in color or brightness, depending on the conditions under which they are illuminated and observed. Many of these security markings can be easily duplicated, so technologies that deliver high-level security are demanded.

U.S. Pat. No. 6,061,122 to Hoshino et al. discloses an optical identification system using high-polymer cholesteric liquid crystals, wherein the authenticity of the system is determined by recognizing optical properties of the cholesteric liquid crystal material that are substantially unaffected by an electric or magnetic field. The ability of the liquid crystal to reflect light at a certain wavelength, wherein the wavelength is dependent on the incident angle of the light, enables the formation of a holographic-like image that is difficult to reproduce.

U.S. Patent Application Publication US 2003/0173539A1 to Muller-Rees et al. discloses a security marking comprising liquid crystalline material with chiral phase, wherein the security marking is invisible to the eye, and the properties of the liquid crystalline material with chiral phase can be detected with the aid of detection devices, such as a polarizer or color filter.

U.S. Pat. No. 6,580,481 to Ueda et al. discloses an information recording/displaying card including an invisible written information area and a visible written information area. The invisible written information is recorded to be invisible, and can be accessed by a second device for reading. The invisible information is recorded on a magnetic recording layer, a write-once optical recording layer, or in an integrated circuit memory in which information can be recorded and erased.

The above-described security markings either require special equipment to retrieve hidden information, or the information is not hidden, but simply difficult to reproduce. There is a need for a security marking that is invisible in normal use conditions, but can be made visible to the human eye without the need for specialized selection devices, and which is difficult to duplicate.

SUMMARY OF THE INVENTION

A bistable display comprising a permanent hideable mark is described, wherein the bistable display comprises a substrate and a layer of bistable material, wherein the bistable material has an imagewise pattern that is viewable in a first state of the bistable material, hidden in a second state of the bistable material, and is not erasable. The permanent hideable mark can be hidden or revealed multiple times, and is permanent. Methods of forming the mark, hiding the mark, and revealing the mark are also disclosed.

ADVANTAGES

The bistable display having a permanent hideable mark and the method of forming the permanent hideable mark on the bistable display provides permanent written images that can be repeatedly hidden and retrieved on a display without affecting non-hidden information on the display.

DETAILED DESCRIPTION OF THE PREFERRED EMBODIMENT

Figure 1:
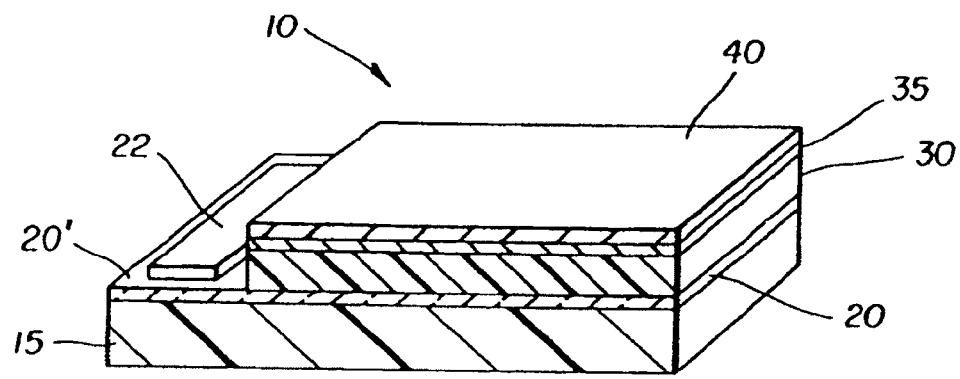
FIG. 1 is a partial cross sectional view of a display element.

A display having a permanent hideable mark and a method of forming the permanent hideable mark in the display are described. The permanent hideable mark can be used for security purposes, as an identifier, as decorative art, or to carry information.

The bistable display can be a rewritable, electronic display. The display can include one or more electrically imageable material. The electrically imageable material can be light emitting or light modulating. Light emitting materials can be inorganic or organic in nature. Exemplary light emitting materials can include organic light emitting diodes (OLED) and polymeric light emitting diodes (PLED). The light modulating material can be reflective or transmissive. Light modulating materials can be electrochemical, electrophoretic, electrochromic, or liquid crystals. The liquid crystalline material can be nematic, or smectic, and can be doped with chiral dopants to form chiral nematic or chiral smectic liquid crystal materials. The liquid crystalline material can be operated in twisted nematic (TN), super-twisted nematic (STN), ferroelectric, or other modes, and can be switched by electric or magnetic field. According to various embodiments, the display can include chiral nematic liquid crystals. The chiral nematic liquid crystals can be polymer dispersed cholesteric liquid crystals (PDCLC). According to various embodiments, more than one bistable material can be used in the display.

The electrically imageable material can be addressed with an electric field to form an image, and can retain its image after the electric field is removed, a property referred to as "bistable." Particularly suitable electrically imageable materials that exhibit "bistability" are electrochemical, electrophoretic, electrochromic, magnetic, ferroelectric liquid crystal, or cholesteric (chiral nematic) liquid crystal materials. Certain nematic liquid crystals having proper surface treatment also exhibit bistability, such as those found in a Zenithal Bistable Display from ZBD Displays Ltd., Worcester, England, or a BiNem® display from Nemoptic, Magny les Hameaux, France, as disclosed by I. Dozov in "Bistable Liquid Crystal Technologies" (SID 2003, pp. 946-949). According to certain embodiments, the bistable material can be chiral nematic liquid crystals, which can be formed as polymer dispersed cholesteric liquid crystals.

The substrate of the display can be any suitable material, for example, glass or plastic. When the substrate is plastic, it can be flexible, for example, a flexible self-supporting plastic film. "Plastic" means a polymer, usually made from polymeric synthetic resins, which can optionally be combined with other ingredients, such as curatives, fillers, reinforcing agents, colorants, and plasticizers. Plastic includes thermoplastic materials and thermosetting materials. The substrate can be transparent or opaque. The substrate can be coated at least partially with a colored or opaque material to prevent viewing of the electronic components on the substrate in the formed display element. Suitable materials for a flexible substrate can include, but are not limited to, polyethylene terephthalate, polyethylene naphthalate, and polyimide. The substrate can withstand temperatures required for attaching electronic components by solder reflow. The substrate can provide dimensional stability during manufacture of the display element. The substrate can have a thickness of between 12 and 300 microns, although thicker or thinner substrates can be used as desired. According to various embodiments, the bistable material can be between two substrates.

Where a flexible plastic substrate is used, it can be reinforced with a hard coating, for example, an acrylic coating. The coating can have a thickness of from 1 to 30 microns, for example, from 2 to 4 microns. Various suitable hard coatings can be used, dependent upon the substrate material. Such coatings can include a mixture of UV-cured polyester acrylate and colloidal silica, known as "Lintec" by Lintec Corporation of Tokyo, Japan, and an acrylic coating sold as Terrapin® by Tekra Corporation, New Berlin, Wis.

The bistable material can be formed on the substrate in a pattern. The bistable material can be coated, printed, or otherwise applied in a pattern corresponding to a desired mark, or the inverse, or negative, of the mark. A second bistable material with different properties can be used to fill in between patterned areas of the first bistable material, to form a layer around the patterned first bistable material to the edges of a display area on the substrate, or both. The display area can be all, or one or more portion, of the substrate.

A filler material can be used between patterned areas of the first bistable material. When a filler is used, the layer of bistable material can include the first bistable material and filler, wherein the first bistable material fills the display area except for the pattern defined by the filler. Optionally, the layer can include a second bistable material outside the area of the permanent hideable mark, or that forms the permanent hideable mark with the filler. Where the bistable material layer includes more than one material, the materials can be of the same or different thicknesses on the substrate. For example, the material forming the pattern (first bistable material or filler) can be thicker or thinner than the remaining materials forming the layer.

Alternately, a uniform layer of bistable material can be applied to the substrate, and an image formed by imagewise exposure of the bistable material to energy in the form of heat, light, or electric field, sufficient to cause a permanent hideable image in the bistable material. A "permanent hideable image" is one wherein the bistable material is subjected to sufficient energy to create a permanent image in the bistable material that is not erasable, but wherein the image is still capable of being hidden when the surrounding bistable material is set to a predetermined viewing state. The surrounding bistable material can be the same or a different material as that forming the image, and can be the same or a different thickness as the bistable material forming the image.

There are three critical energy levels, wherein "energy" can be heat, light, or electric field, that define the permanency of an image in a given bistable material. The first energy level is the upper limit at which an image can be reversibly formed. Between the first and second energy levels, the image sticks, such that it requires several repeated erasure procedures to remove the image. Above the second energy level, the image is permanent but hideable, such that the image is viewable in certain states, and hidden in others, but is not erasable. The contrast of the permanent hideable image to the surrounding display areas can change over time, but the image remains clearly visible over a critical number of viewings, for example, greater than 20, greater than 50, greater than 100, or greater than 500 viewings, the critical number of viewings dependent upon the expected use of the mark over the expected life of the display. Above the third energy level, the image becomes permanent such that it cannot be hidden in any state, and cannot be erased. The energy levels are dependent on the type and thickness of the bistable material, and can be effected by the material of adjacent layers, for example, a dark layer, and the type of energy used.

The non-imaged areas of the bistable material layer can be written and erased as known in the art, to convey rewritable information. The bistable material can have two or more viewable states, and the rewritable information can be conveyed in one or more of the viewable states. For example, the rewriteable information can appear in one of two contrasting, or light and dark, states, or can include one or more grey level between a light and dark state. The writing and erasing of the rewritable information does not affect the permanent hideable mark. If desired, the non-imaged areas of the bistable display can contain permanent information that is not erasable and is always viewable. A combination of permanent and rewritable information can be present in the non-imaged area of the bistable display.

Specific examples of the formation of a permanent hideable mark on a bistable material are set forth in the Figures and described in the following text. Those skilled in the art, based on known bistable display structures, the information provided herein, and the following examples, can form a permanent hideable mark in other bistable materials described herein.

FIG. 1 is a partial cross sectional view of a cholesteric liquid crystal display element that can be written with security information in accordance with the present invention. The display element 10 includes a substrate 15, such as a thin polymeric material. Suitable materials include, for example, Kodak Estar film base formed of polyester plastic that has a thickness of between 20 and 200 microns, for example, 125 microns. Other polymers, such as polycarbonate, can also be used in any thickness suitable for the intended purpose. The substrate can be transparent or opaque. The substrate can be rigid or flexible. According to various embodiments, two substrates can be used, and at least one substrate can be transparent.

The display element can be flexible. The display element can be made in any shape, for example round, rectangular, parallelogram, square, or irregular. One or more display element can be used to form a display. According to certain embodiments, the display can be flexible. The display can have any three dimensional shape, for example, flat, curved, round, polygonal, square, cubed, or irregular. The display, when flexible, can follow the shape of a surface to which it is attached, for example, turning a corner of a wall. The display can be double-sided, having at least one display element on each side. Where the display is polygonal, each face of the polygon can be at least one display element. Each viewing surface of the display, regardless of display shape, can include one or more display elements. If multiple display elements are used, they can be arranged in a pattern, form a grid covering at least a portion of the surface of the display element, or each display element can abut at least one other display element.

A first conductor 20 can be formed on substrate 15. First conductor 20 can be any conductive material, for example, tin-oxide, indium-tin-oxide (ITO), or polythiophene. The first conductor 20 can be transparent. The first conductor 20 can be sputtered, coated, or printed by any known methods in the art to form a layer over substrate 15. The first conductor 20 can be coated as a continuous layer, discontinuous layer, or patterned. The first conductor can include one or more conductive layers, wherein each layer can be the same or different material. The first conductor 20 can have a resistance of less than 1000 ohms per square.

A bistable material, for example, cholesteric liquid crystal layer 30, can overlay at least a first portion of first conductor 20. A portion of cholesteric layer 30 can be removed to expose a portion of first conductor 20' to permit electrical contact with the portion of first conductor 20'. Cholesteric layer 30 can contain a chiral nematic, or cholesteric, liquid crystal material, such as described, for example, in U.S. Pat. No. 5,695,682 to Doane et al. Application of electrical fields of various intensity and duration can be employed to drive the cholesteric material into a reflective state, a substantially transparent state, or an intermediate state. Cholesteric liquid crystal material has optical states that are stable in the absence of an electrical field. The materials can maintain a given optical state indefinitely after the field is removed. Suitable cholesteric liquid crystal materials can include, for example, Merck BL112, BL118, or BL126, available from E.M. Industries of Hawthorne, N.Y.

Cholesteric layer 30 can include a cholesteric material, for example, BL-118 from E.M. Industries, dispersed in a binder, for example, deionized photographic gelatin, polyvinyl alcohol (PVA), or polyethylene oxide (PEO). The ratio of liquid crystal material to binder can be from about 8:1 to 1:8. For example, the liquid crystal material can be at a concentration of 8% in a 5% gelatin aqueous solution binder. The liquid crystal material can be dispersed to create an emulsion of 8-10 micron diameter domains of the liquid crystal in an aqueous suspension. The domains can be formed, for example, using the limited coalescence technique described in U.S. Pat. No. 6,423,368 to Stephenson et al.

The cholesteric liquid crystal emulsion can be coated over the first conductor 20 on the substrate 15 and dried to provide a polymer dispersed cholesteric coating, forming the cholesteric liquid crystal layer 30. The cholesteric liquid crystal layer 30 can be machine coated using coating equipment employed in the manufacture of films. The cholesteric liquid crystal layer 30 can be any suitable thickness, for example, from 2 to 30 microns thick, for example, 9 microns thick. According to various embodiments, a thin layer of gelatin can be applied over the first transparent conductor 20 to provide an insulator prior to applying cholesteric liquid crystal layer 30, as disclosed in U.S. Pat. No. 6,690,447 to Stephenson et al.

Figure 2A:
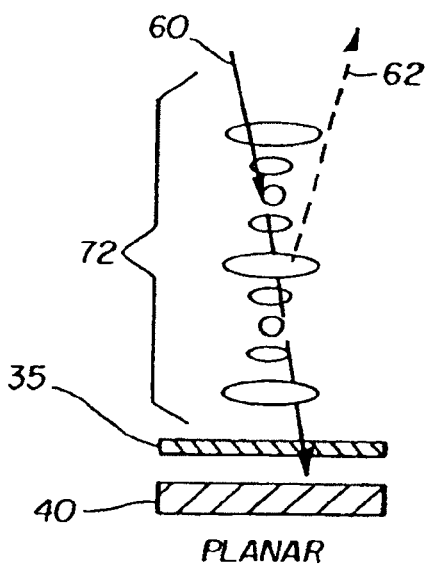
FIGS. 2A and 2B are schematic side views of chiral nematic material in a planar state and focal conic state, respectively.
Figure 2B:
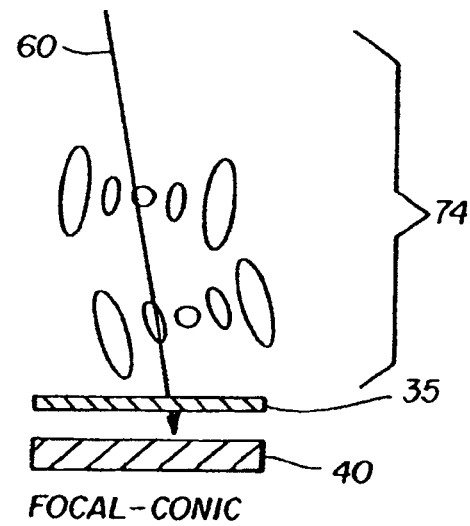

FIGS. 2A and 2B are schematic side sectional views of a chiral nematic liquid crystal material responding to incident light, wherein the material is in a planar state (FIG. 2A) or a focal conic state (FIG. 2B). To achieve the planar state shown in FIG. 2A, a high voltage field has been applied to the liquid crystal and quickly switched to zero potential to form planar liquid crystal 72, which reflect portions of incident light 60 as reflected light 62, so the viewer perceives a bright image. To achieve the focal conic state shown in FIG. 2B, a lower voltage field can be applied to the liquid crystal to cause the molecules of the chiral nematic material to break into weakly forward scattering cells known as focal conic liquid crystal 74. Increasing the time duration of a low-voltage pulse can progressively drive the molecules that were originally reflective planar liquid crystal 72 towards a fully evolved and weakly light scattering focal conic liquid crystal 74.

As shown in FIGS. 1, 2A, and 2B, a light absorbing dark layer 35 can be adjacent the cholesteric layer 30 on the side of the substrate 15, or the side of the cholesteric layer 30 opposite from the substrate 15, to improve contrast of the display. The dark layer 35 can be separated from the cholesteric layer 30 by one or more layer, so long as the distance of separation allows transfer of heat from the dark layer 35 to the cholesteric layer 30 sufficient to affect the state of the cholesteric layer 30. The dark layer 35 can absorb visible, ultraviolet, and/or infrared (IR) light. According to various embodiments, the dark layer can convert absorbed light to heat.

According to various embodiments, the dark layer 35 can absorb only a portion of the visible spectrum, and has a colored appearance. Dark layer 35 can include one or more dyes, colorants, pigments, or materials capable of absorbing light, converting light to heat, or both. For example, dark layer 35 can include a black dye, pigment, or colorant; a metal, for example silver; or a colorless UV-absorber. Dark layer 35 can be a thin layer of light absorbing, sub-micron carbon in a gel binder as described, for example, in U.S. Pat. No. 6,639,637 to Stephenson.

As shown in FIG. 2B, as fully evolved focal-conic liquid crystal 74, the cholesteric liquid crystal is forward light scattering, and incident light 60 is adsorbed by dark-layer 35 to create a dark image. As the cholestelic material changes from reflective planar liquid crystal 72 shown in FIG. 2A to a fully evolved light scattering focal conic liquid crystal 74 shown in FIG. 2B, a viewer will perceive reflected light 62 fading to black.

Returning to FIG. 1, dark layer 35 can be disposed between cholesteric liquid crystal layer 30 and a second conductor 40. The second conductor 40 can overlay cholesteric layer 30, or can overlay dark layer 35. Second conductor 40 can function as a dark layer 35, making an additional dark layer unnecessary. According to various embodiments, second conductor 40 can be transparent. Second conductor 40 can be formed, for example, by techniques known in the art for forming a layer of conductive material. Such techniques can include, for example, vacuum deposition, film coating, electroplating, printing, sputtering, or other deposition techniques known in the art. The second conductor 40 can be patterned non-parallel to patterning of the first conductor 20. The intersection of the first conductor 20 and the second conductor 40 can form a pixel, wherein the cholesteric liquid crystal layer 30 in the pixel changes state when an electric field is applied between the first and second conductors. Alternately, the second conductor 40 can be formed as electrically conductive character segments over cholesteric liquid crystal layer 30 by thick film printing, sputter coating, or other printing or coating means. The conductive character segments can be arranged to form numbers 0-9, a slash, a decimal point, a dollar sign, a cent sign, or any other alpha-numeric character or symbol.

Second conductor 40 can be any material capable of providing sufficient conductivity to form an electric field between the first conductor 20 and second conductor 40 strong enough to change the optical state of the cholesteric material in cholesteric layer 30. The second conductor 40 can be any conductive material, for example, metals such as aluminum, tin, silver, platinum, carbon, tungsten, molybdenum, tin, indium, or combinations thereof, or a conductive ink. Suitable conductive inks, such as Electrodag 423SS from Acheson Corporation, can be formed into a conductive layer by screen printing on the dark layer 35 or on cholesteric liquid crystal layer 30. Suitable screen-printable conductive materials can include finely divided graphite particles in a binder such as a thermoplastic resin.

Figure 3:
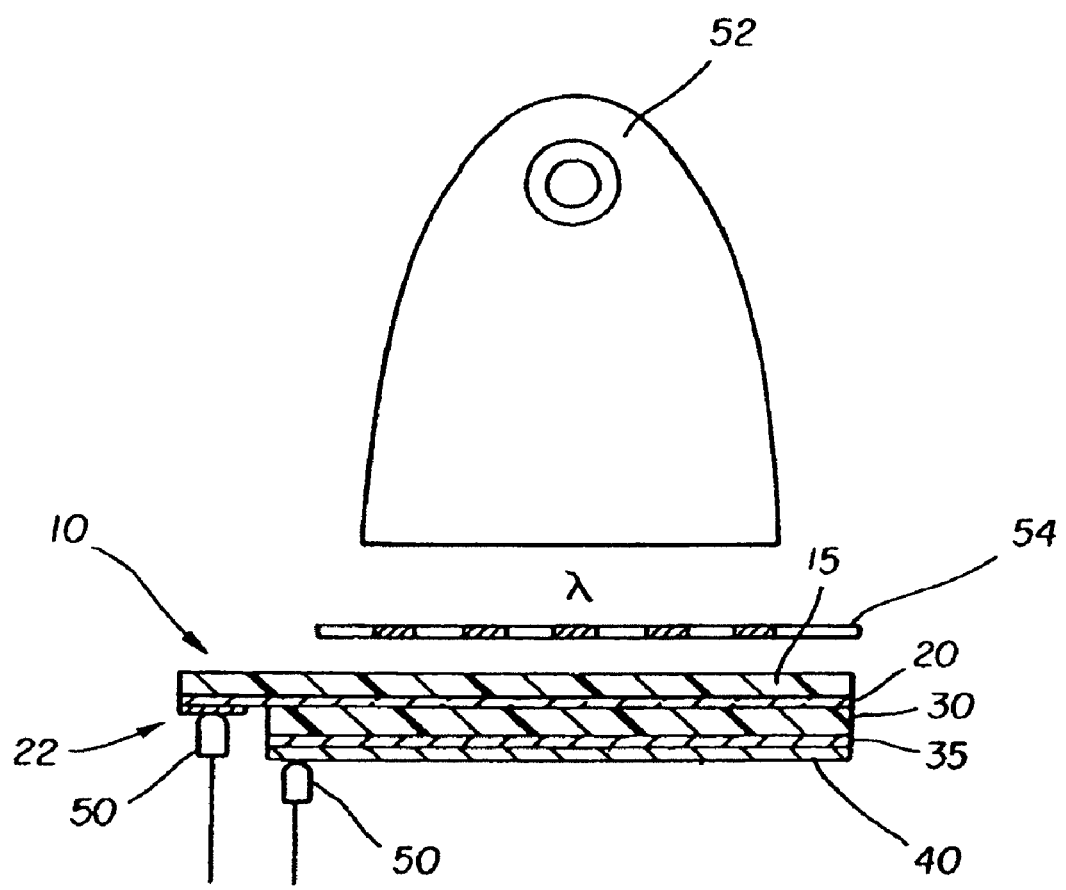
FIG. 3 is schematic side view of an apparatus that can be used to write security information on a display element in accordance with the present invention.

As shown in FIG. 3, a conductive cover 22 can be formed over a portion of first conductor 20' to protect the portion of first conductor 20' from abrasion. The conductive cover 22 can be any conductive material, and can be formed in any known manner, including screen printing, coating, or other known methods.

A dielectric layer such as deionized gelatin can be formed over the conductive character segments by standard printing or coating techniques. Via holes can be formed over each conductive character segment by the absence of the dielectric layer over at least a portion of each conductive character segment, or by removing a portion of the dielectric layer over each conductive character segment, for example, by ablation or chemical etching.

Electrically conductive traces can be formed over the dielectric layer by printing or coating techniques. One or more electrically conductive trace can flow through a via hole on formation, making electrical contact with the conductive character segment. The conductive traces can extend from the character segment to an exposed area along a side of the display, where the conductive trace forms a contact pad in the exposed area. The exposed area is an area of the substrate coated with the first conductive layer.

The contact pads can be any conductive material, for example, silver or carbon. The contact pads can be formed with the conductive traces, or separately therefrom. Contact pads that are not formed with the conductive traces can be coated or printed on the dielectric layer. A via hole can extend from the conductive pad through the dielectric layer to the first conductive layer. The exposed area and the contact pads thereon can be formed along one side of the display, along multiple sides of the display, or in one or more locations on the display not including the conductive character segment. According to various embodiments, the contact pads can be formed in the exposed area along one edge of the display. The contact pads can be placed linearly or grouped, such as in a pattern, for example, a square or rectangle, in the exposed area.

The optical state of the bistable material between the conductive character segment and the first conductive layer can be changed by selectively applying drive voltages to the corresponding contact pad that is electrically connected to the conductive character segment through a conductive trace, and to the first conductive layer by direct or indirect contact. Once the optical state of the bistable material has been changed, it can remain in that state indefinitely without further power being applied to the conductive layers. Methods of forming the display element are known to practitioners in the art, and are described, for example, in U.S. Ser. No. 10/134,185, filed Apr. 29, 2002 by Stephenson et al., and in co-filed U.S. Ser. No. 10/851,440 filed May 21, 2004, by Burberry et al.

One or more display element can be attached to an electrical interconnect substrate. The electrical interconnect substrate can include alignment features for aligning the display element on the electrical interconnect substrate, one or more contact pads for making an electrical connection to a display element, and one or more contact pads for making electrical connection to the display drive source. One or more electrical interconnect substrate can be attached to each display element. One or more display element can be connected to each electrical interconnect substrate.

The electrical interconnect substrate can have one or more display element attached to one surface, or to both surfaces of the electrical interconnect substrate. The attachment can be physical, wherein the display element and electrical interconnect substrate are held together by compression, friction, adhesive bonding, or by other mechanical means, such as tabs, clips, or pins. The electrical interconnect substrate can be electrically connected to one or more physically attached display element. The electrical interconnect substrate can be electrically connected to one or more display elements directly or by secondary connections, such as wires.

A display drive source can be a circuit board for writing or rewriting the display. According to certain embodiments, the circuit board can include a power source, such as a battery. According to other embodiments, the circuit board is capable of connection to an external power source, for example, a battery or an electrical circuit. The display drive source can be connected to the electrical interconnect substrate physically. The display drive source can be electrically connected to the electrical interconnect substrate directly or through some secondary connections, such as wires.

FIG. 3 is schematic side view of a device for writing a permanent hideable mark on the display element. As shown in FIG. 3, a display element 10 can be positioned so that a light 52, such as a conventional xenon flash, exposes portions of display element 10 through a mask 54. Suitable light sources can include high intensity lights, for example, a SUNPAK auto 383 professional flash lamp with a reflector, a Speedotron model 202VF light unit powered by 2405CX power supply, and a Vivitar model 285HV professional flash lamp. If a reflector is used with the lamp, the reflector can be modified to more uniformly and efficiently direct light through a mask 54 to the display element 10.

The mask 54 can be any suitable material, for example, a polymeric material, metal, ceramic, or treated glass, wherein the material is capable of blocking light and/or heat from the writing source from reaching designated areas of the display element 10. The mask can be transparent to light, or heat conductive, in a pattern corresponding to the desired image. In other embodiments, the mask can be transparent to light, or heat conductive, in a pattern corresponding to the negative, or outline, of the desired image. For example, a transparent polymeric sheet, such as Dupont Mylar, can be used as the mask with an electro-photographic printed image formed on the sheet, wherein the image corresponds to the permanent hideable mark. According to various embodiments, the mask can be a dot matrix super twisted-nematic (STN) display, part number TM 320240AG, from Tianma Microelectronics Corporation in China.

To imprint a permanent hideable image in the cholesteric layer of the display element 10, light or heat can be applied through the mask to form the image or its negative. For example, the output of flash light 52 can be adjusted to imprint an image on display element 10, regardless of the initial state of the cholesteric material in element 10, that is, whether the cholesteric liquid crystal material is in a planar state, a focal conic state, or any gray-scale state in between planar and focal conic. The intensity of the energy from the writing device can be sufficiently high so that the imprinted image in the liquid crystal is permanent, that is, the image can not be erased, while being low enough to ensure the image is still hideable. For example, for the display element including cholesteric material as described herein, the intensity of light needed to form a permanent hideable image is greater than 500 $mJ/cm^2$, preferably about 640 $mJ/cm^2$, as measured by a Coherent FM-GS Energy Meter. Depending on the light absorbing efficiency of the dark layer, the spectral and temporal dependence of the energy in the light source, the heat response of the liquid crystal, the thickness of the liquid crystal layer, and other factors known in the art, the energy needed to form a permanent hideable image in the liquid crystal can be more or less. During the exposure to the energy source, no electrical field is needed to write the image.

The permanent hideable image can be formed on the cholesteric liquid crystal material using an energy source such as a flash lamp, as indicated above; heat, for example, a heat lamp, laser, or thermal printhead; or radiation, such as infrared or ultraviolet radiation. The energy needed to permanently write the image can be determined based on the thickness of the cholesteric liquid crystal material layer, the energy level, the distance from the energy source to the display element, and the properties of the dark layer of the display element, if present. Optionally, an electrical field can be used simultaneously with the energy source to enable use of a lower amount of energy. The energy can be applied through a mask, as described above, to form the image, or can be applied in an image-wise fashion without a mask, such as by using a laser or thermal printhead, where the effected area of the liquid crystal can be controlled.

The permanent hideable image can be formed in the cholesteric layer at any time after it is applied to the substrate. For example, the image can be formed immediately after formation of the cholesteric layer on the substrate, after application of a dark layer to the cholesteric layer, after formation of additional layers of the display element, or after the entire display element is formed. The permanent hideable image can be formed before or after formation or rewritable or permanent non-hideable information on the display element.

Figure 4A:
FIG. 4A is a schematic view of the display element of FIG. 1 in the planar state.
Figure 4B:
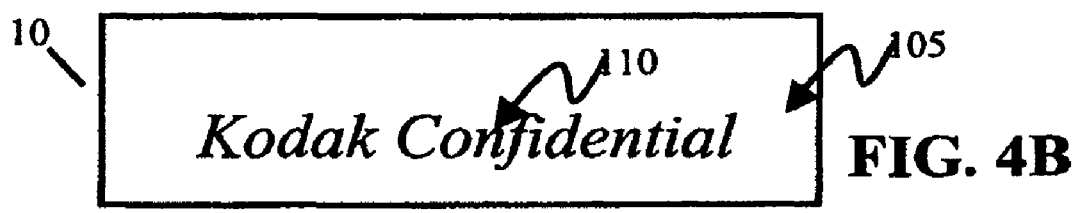
FIG. 4B is a schematic view of the display element of FIG. 4A after exposure to light through an information carrying mask.
Figure 5A:
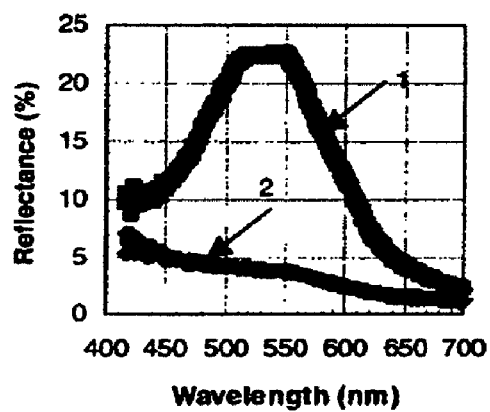
FIG. 5A is a spectra plot of a reflectance of the display element of FIG. 4B in a planar state (1) and when it is exposed to light (2)

To write the permanent hideable information, a display element 10 can be first placed in a planar state by any means known in the art, for example, by application of an voltage pulse, heat, light, or an electric field, as disclosed, for example, in U.S. Patent Application Publication US 2004/0061808A1 to Stephenson et al. For example, a 100 milliseconds voltage pulse of 140 volts can be used. FIG. 4A is a schematic view of the display element 10 in a planar state 100, which appears to the viewer as bright across the whole area of the display element 10. The display element 10 can then be exposed to a flash light through a mask as described herein, for example, a flash of light from a SUNPAK auto 383 professional flash lamp with a modified reflector through a mask of Dupont Mylar transparency film with an electro-photographic printed image "Kodak Confidential." FIG. 4B is a schematic view of the display element 10 after exposure to the flash light through the mask, wherein the imprinted image "Kodak Confidential" is visible. The areas of the display element 10 receiving greater and smaller amounts of energy, respectively, to form the permanent hideable image are referred to as information area 110 and background area 105, respectively. According to various embodiments, the information area 110 can be the area receiving less energy, while the background area 105 receives more energy. Curves 1 and 2 in FIG. 5A depict reflectance spectral plots of the information and background areas of FIG. 4B, respectively.

Figure 4C:
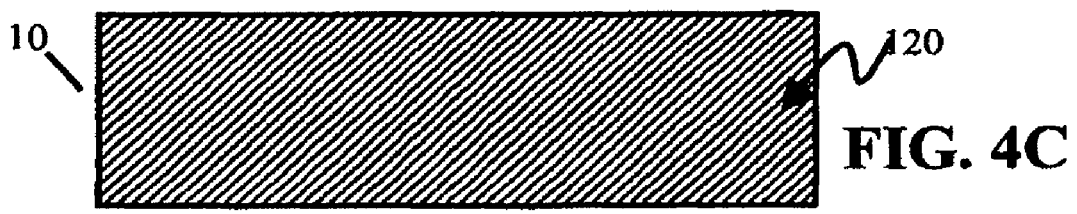
FIG. 4C is a schematic view of the display element of FIG. 4B, switched into a focal conic state.
Figure 5B:
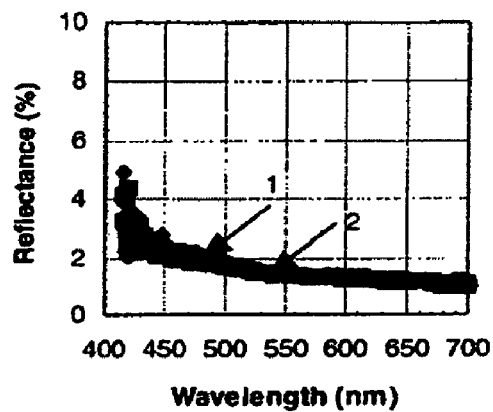
FIG. 5B is a spectra plot of a reflectance of the display element of FIG. 4C in states (1) and (2)

The words "Kodak Confidential," can be hidden in a focal conic state 120 as illustrated in FIG. 4C with a second voltage pulse, heat, light, or electric field. For example, a 1000 milliseconds voltage pulse of 60 volts can be used to change the cholesteric layer to the focal conic state. In the focal conic state, the display element 10 appears dark across the whole area to a viewer. Curves 1 and 2 in FIG. 5B depict reflectance spectral plots of information and background areas, respectively, as shown in FIG. 4C. As can be seen in FIG. 5B, curves 1 and 2 overlay each other and are indistinguishable, indicating that the permanent hideable image is not visible to the viewer.

Figure 4D:
FIG. 4D is a schematic view of the display element of FIG. 4B, switched into a planar state.
Figure 5C:
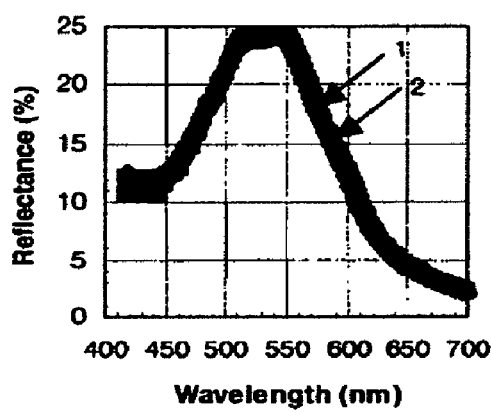
FIG. 5C is a spectra plot of a reflectance of the display element of FIG. 4D in states (1) and (2)

Starting from the state of FIG. 4B, the permanent hideable image can be hidden in a planar state 122 as illustrated in FIG. 4D with a third voltage pulse, heat, light, or electric field. For example, a 1000 milliseconds voltage pulse of 140 volts can be used to place the cholesteric layer in a planar state. In the planar state, the display element 10 appears bright across the whole area to the viewer. Curves 1 and 2 in FIG. 5C depict reflectance spectral plots of information and background areas, respectively, as shown in FIG. 4D. As can be seen in FIG. 5C, curves 1 and 2 overlay each other and are indistinguishable, indicating that the permanent hideable image is not visible to the viewer.

Figure 4E:
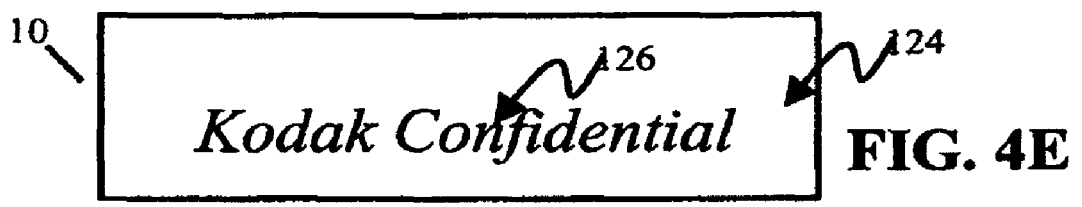
FIG. 4E is a schematic view of the display element of FIG. 4C or 4D, switched into an information readable state.
Figure 5D:
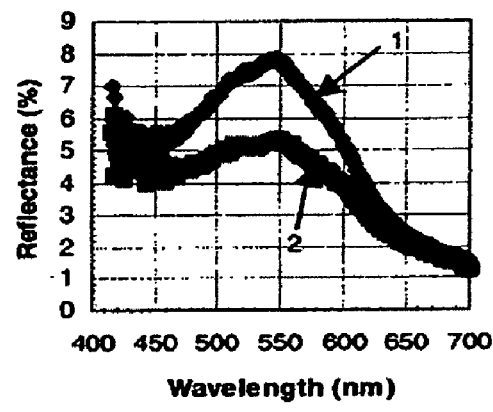
FIG. 5D is a spectra plot of a reflectance of the display element of FIG. 4E in states (1) and (2)

The permanent hideable image, "Kodak Confidential," can be retrieved from either the focal conic state (FIG. 4C) or the planar state (FIG. 4D) by application of a fourth voltage pulse, heat, light, or electric field. For example, a 1000 milliseconds voltage pulse of 80 volts, as illustrated in FIG. 4E can be used to retrieve the permanent hideable image. Upon retrieval of the image, the display element 10 appears different in information area 126 and background area 124, such that the permanent hideable image is readable. Curves 1 and 2 in FIG. 5D depict reflectance spectral plots of the information and background areas, respectively, of FIG. 4E. As shown in FIG. 5D, the curves 1 and 2 are again separate and distinguishable, as they were on first writing the permanent hideable image (see FIGS. 4B and 5A).

Figure 6A:
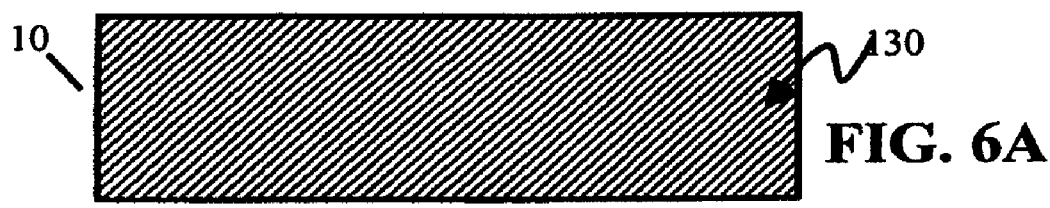
FIG. 6A is a schematic view of the display element of FIG. 1 in the focal conic state.
Figure 6B:
FIG. 6B is a schematic view of the display element of FIG. 6A after exposure to light through an information carrying mask.
Figure 7A:
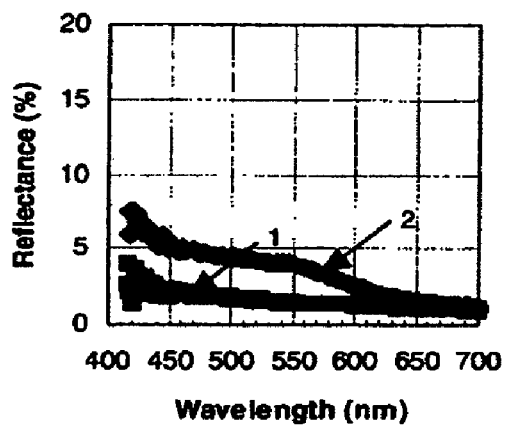
FIG. 7A is a spectra plot of a reflectance of the display element of FIG. 6B in a focal conic state (1) and when it is exposed to light (2)

To write the permanent hideable image, a display element 10 can be first placed in a focal conic state by application of a voltage pulse, heat, light, or electric field, as disclosed in U.S. Patent Application Publication US 2004/0061808A1 to Stephenson et al. For example, a 100 milliseconds voltage pulse of 60 volts can be used to place the cholesteric layer in a focal conic state. FIG. 6A is a schematic view of the display element 10 in a focal conic state 130, which state makes the display element appear dark across the whole area to the viewer. The display element 10 can be exposed to a flash light as described above to create a permanent hideable image, for example, "Kodak Confidential," having an information area 140 and a background area 135, as shown in FIG. 6B. Curves 1 and 2 in FIG. 7A depict reflectance spectral plots of information area 140 and background area 135, respectively, of FIG. 6B.

Figure 6C:
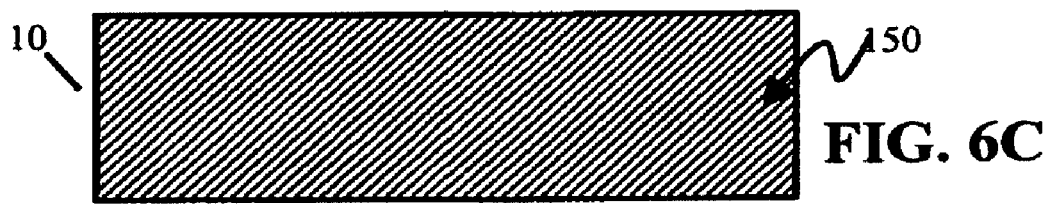
FIG. 6C is a schematic view of the display element of FIG. 6B, switched into a focal conic state.
Figure 7B:
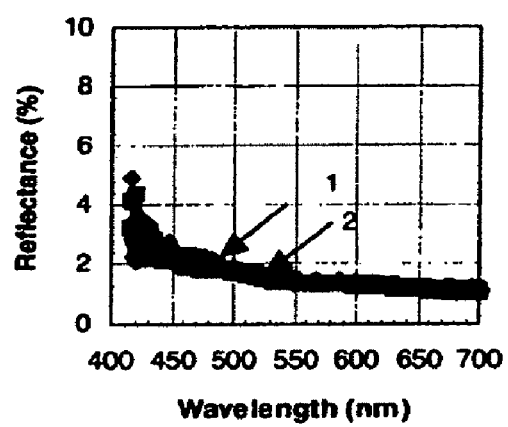
FIG. 7B is a spectra plot of a reflectance of the display element of FIG. 6C in states (1) and (2)

The permanent hideable image, "Kodak Confidential," can be hidden in a focal conic state 150 as illustrated in FIG. 6C by application of a second voltage pulse, heat, light, or electric field. For example, a 1000 milliseconds voltage pulse of 60 volts can be used to place the cholesteric layer in the focal conic state, making the display element 10 appear dark across the whole area. Curves 1 and 2 in FIG. 7B depict reflectance spectral plots of information and background areas, respectively, from FIG. 6C. As seen in FIG. 7B, curves 1 and 2 overlay each other and are indistinguishable, indicating that the permanent hideable image is hidden from view.

Figure 6D:
FIG. 6D is a schematic view of the display element of FIG. 6B, switched into a planar state.
Figure 7C:
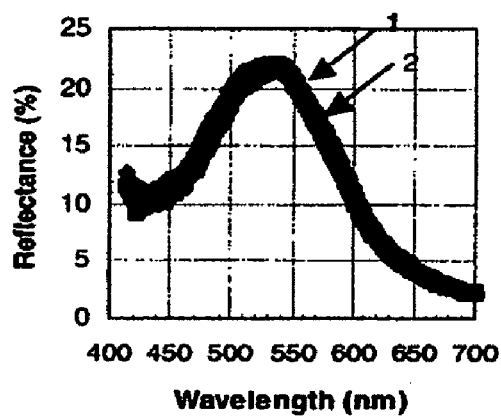
FIG. 7C is a spectra plot of a reflectance of the display element of FIG. 6D in states (1) and (2)

The permanent hideable image, "Kodak Confidential," can be hidden in a planar state 152 starting from the visible focal conic state of FIG. 6B, as illustrated in FIG. 6D by application of a third voltage pulse, heat, light, or electric field. For example, a 1000 milliseconds voltage pulse of 140 volts can be applied to place the cholesteric layer in a planar state, making the display element 10 appear bright across the whole area. Curves 1 and 2 in FIG. 7C depict reflectance spectral plots of information and background areas, respectively, of FIG. 6D. As seen in FIG. 7C, curves 1 and 2 overlay each other and are indistinguishable, indicating that the permanent hideable image is hidden from view.

Figure 6E:
FIG. 6E is a schematic view of the display element of FIG. 6C or 6D, switched into an information readable state.
Figure 7D:
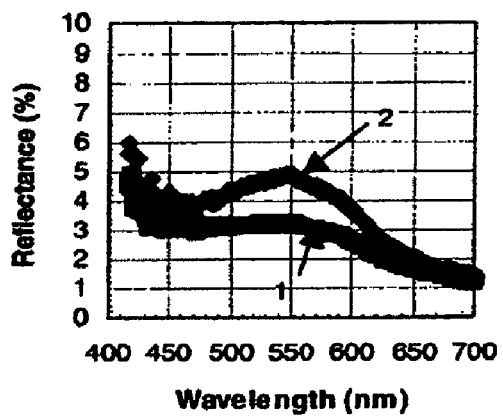
FIG. 7D is a spectra plot of a reflectance of the display element of FIG. 6E in states (1) and (2)

The permanent hideable image, "Kodak Confidential," can be retrieved from either the hidden focal conic or planar state, as illustrated in FIG. 6E by application of a fourth voltage pulse, heat, light, or electric field. For example, application of a 1000 milliseconds voltage pulse of 80 volts can retrieve the permanent hideable image. As shown in FIG. 6E, the display element 10 appears different in information area 156 and background area 154, such that the permanent hideable image is now readable. Curves 1 and 2 in FIG. 7D depict reflectance spectral plots of the information and background areas of FIG. 6E, respectively. As seen in FIG. 7D, curves 1 and 2 are separate and distinguishable, as they were when the permanent hideable image was first written (see FIGS. 5B and 7A).

To erase; write; rewrite non-permanent information, or permanent non-hideable information, on the displays described above, electrodes can be applied to the first conductor cover if present, or to the first conductor, and to the second conductor. An electrical field can be applied across the electrodes to erase any existing non-permanent visible images on the display. The display can be written by flash writing, application of an electrical field, heat, or a combination thereof. For flash writing, a light or heat pulse of a certain power and duration provides a thermal flux effect that can write cholesteric material into a planar, focal conic, or gray state. The display can be written and erased repeatedly without damage to the permanent hideable information or the display structure.

Figure 8A:
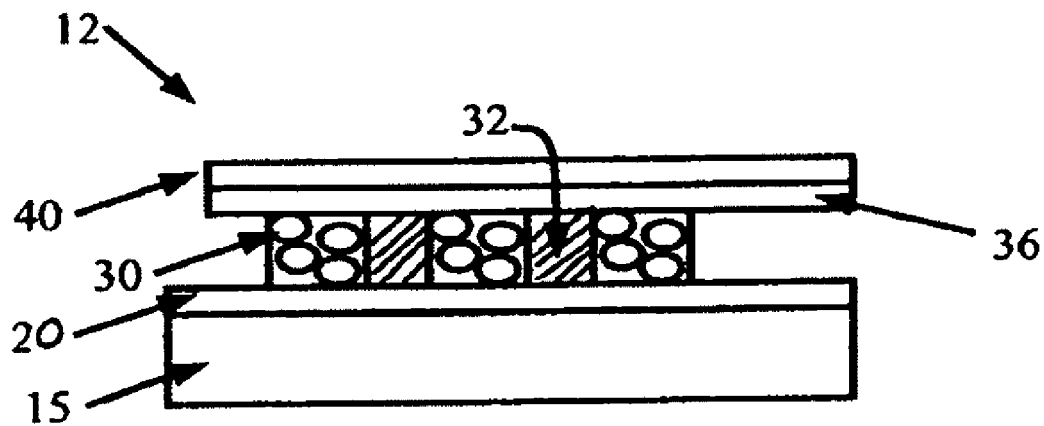
FIG. 8A is a schematic sectional view of an alternative display structure having a patterned cholesteric liquid crystal layer.
Figure 8B:
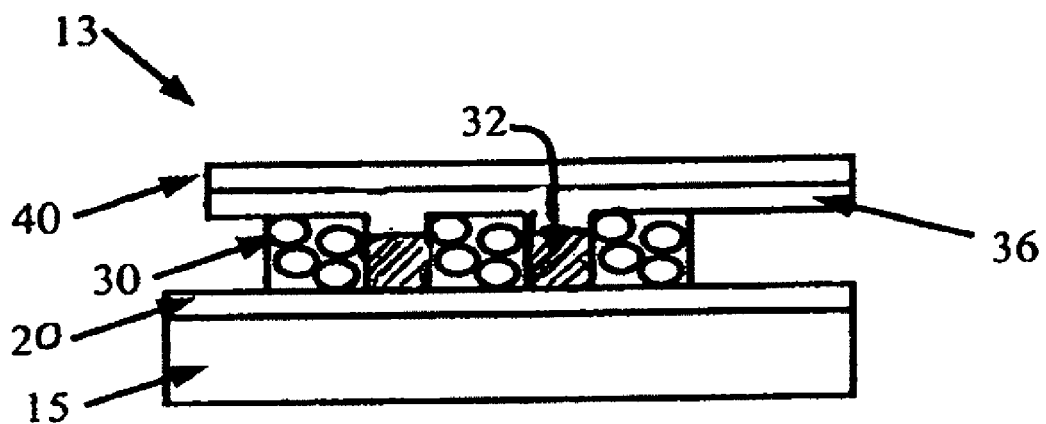
FIG. 8B is a schematic sectional view of an alternative display structure having a patterned cholesteric liquid crystal layer with different thicknesses of liquid crystal.
Figure 8C:
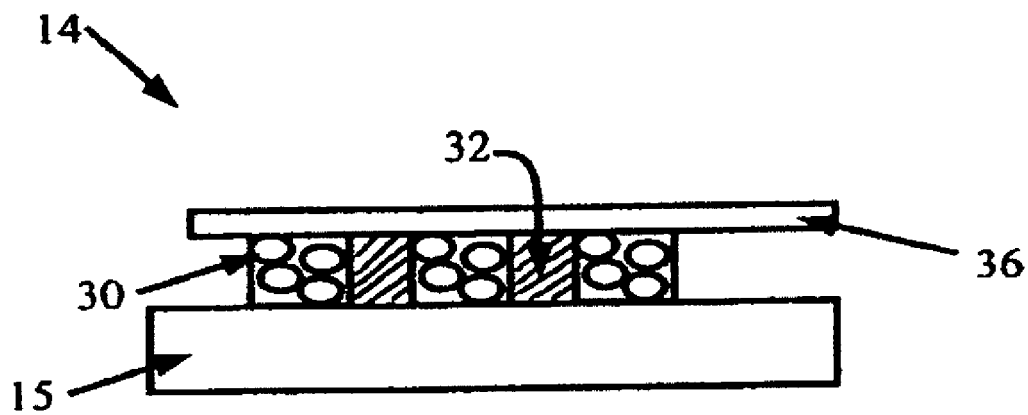
FIG. 8C is a schematic sectional view of an alternative display structure without electrodes.

FIGS. 8A-8C are schematic sectional views of alternative display structures capable of forming a permanent hideable mark that can be hidden and retrieved. Display elements 12, 13, and 14 as shown in FIGS. 8A, 8B, and 8C, respectively, have the same arrangement and components as the display 10 in FIG. 1, unless otherwise noted. The cholesteric liquid crystal layer 30 is formed to create a predetermined pattern in an information area, wherein the pattern corresponds to the permanent hideable image. The pattern can be the image, or the negative of the image. A filling material 32 separates areas of the cholesteric liquid crystal material 30. Filling material 32 can be any material that does not react or interact with the patterned cholesteric liquid crystal layer 30. For example, the filling material 32 can be a binder material, such as gelatin. The filler material 32 can include any bistable material. The filling material 32 can include a bistable material, which can be the same as or different from the bistable material of the cholesteric liquid crystal layer 30. The cholesteric material of the cholesteric liquid crystal layer 30 and the filling material 32 can be different in one or more of thickness (see FIG. 8B), domain size of a liquid crystal component, type of liquid crystal material, or other aspects. When the filling material 32 includes a liquid crystal material, the filling material 32 and cholesteric liquid crystal layer 30 can have at least one voltage to which they respond differently, for example, one material can enter a focal conic state, and the other material can enter a planar state or gray state at a selected voltage. In order to reduce expense, the filling material 32 can be less expensive than the cholesteric liquid crystal layer 30. The filling material 32 can share at least one common optical state with cholesteric liquid crystal layer 30. According to some embodiments, the filling material 32 does not include a liquid crystal material. Each of the liquid crystal material and filling material can be independently printed, etched, sputtered, or coated, with or without a mask, to form the patterned area.

Instead of a dark layer 35 as in FIG. 1, display 12, 13, or 14 can have a background layer 36 which can cover all or a portion of the display element. The background layer can include a pigment, colorant or dye. The background layer can be any suitable thickness, and preferably is only a few microns thick. Background layer 36 can be a dark layer. The background layer can have the same appearance as one of the optical states of the cholesteric liquid crystal layer 30. The background layer 36 can be located between either of the two conductors 20 and 40 and the cholesteric liquid crystal layer 30, or the background layer 36 can be on the opposite side of one of the first conductor 20 or second conductor 40 from the cholesteric liquid crystal layer 30, provided that the respective conductor is transparent.

When the patterned area of the cholesteric liquid crystal layer 30 has the same appearance as the background layer 36, the permanent hideable image is hidden. When the patterned area of the cholesteric liquid crystal layer 30 has a different appearance from the background layer, the permanent hideable image is visible. The switching of the state of the patterned area of cholesteric liquid crystal layer 30 can be carried out by applying voltage across the conductors. This means of forming a display allows information to be pre-built or designed into the display element using patterned cholesteric liquid crystal only in the information area. The information can be rendered invisible by application of a first voltage, restored with application of a second voltage, and hidden again by application of the first voltage. The information can be hidden by changing the cholesteric liquid crystal into a state which has the same appearance as the background area. The background area can be designed to be in the planar state, focal conic state, or any intermediate (gray scale) state.

According to another embodiment, the layer on top of the patterned area of cholesteric liquid crystal layer 30 and filling material 32, that is background layer 36 or second conductor 40, can conform to the shape of the cholesteric layers, as shown in FIG. 8B. Both the patterned area of the cholesteric liquid crystal layer 30 and filling material 32 can be switched into a focal conic state (transparent state), having the appearance of the background, to hide the patterned information, or can both be switched into planar states (reflective) that have the same appearance to hide the information. The information can be retrieved (viewed) by applying a voltage that causes different reflectance from cholesteric liquid crystal layer 30 and filling material 32.

FIG. 8C shows an alternative display element 14, wherein conductors 20 and 40 are absent from the information area. In the information area, the patterned cholesteric liquid crystal layer 30 can be deposited directly on substrate 15. The filling material 32 can be as described above. A background layer 36 can be present over the cholesteric liquid crystal layer 30 and the filling material 32. The background layer 36 can be a dark layer. When the display element 14 is heated above a clearing temperature, where the cholesteric liquid crystal becomes isotropic, and then cooled gradually, it appears dark everywhere. As a result, the permanent information is hidden. When display element 14 is subsequently exposed to a flash of light with an energy level lower than the first critical energy level, the cholesteric liquid crystal layer 30 is switched to a planar state (reflective), and the permanent image becomes visible. The information can be hidden again by reheating the material above the clearing temperature and allowing it to cool gradually. The technique described for hiding and retrieving information with regard to FIG. 8C can be used for hiding and retrieving information in displays 12 and 13 of FIGS. 8A and 8B, respectively, provided that the background layer 36 is a dark layer.

According to the present invention, a permanent hideable image or mark can be made on a display element, wherein the permanent hideable mark can be made viewable or hidden by switching the state of the bistable material in the display element. This invention can be used to form permanent hideable marks for use in forming security data, providing tracking information, or for artistic purposes. The display element can be used alone, in a tag, label, sheet, card, credit card, or other suitable form. The display element with the permanent hideable mark can be associated with a specific good if desired for tracking or identification purposes.

The invention has been described in detail with particular reference to certain embodiments thereof, but it will be understood that variations and modifications can be made within the spirit and scope of the invention.

The invention claimed is:

1. A method of forming a permanent hideable mark on a bistable display, comprising:
   forming a bistable display comprising a substrate and a layer of bistable material on the substrate; and
   forming an imagewise pattern in the layer of bistable material, such that the imagewise pattern is viewable in a first state of the bistable material, hidden in a second state of the bistable material, and is not erasable,
   wherein forming the imagewise pattern in the layer of bistable material comprises forming areas of bistable material and areas of a filling material between the areas of bistable material, such that either the areas of bistable material or the areas of filling material form the imagewise pattern, and
   wherein the filling material comprises a second bistable material.

2. The method of claim 1, wherein the filling material comprises the bistable material and the second bistable material, wherein the second bistable material is different from the bistable material.

3. The method of claim 1, wherein the filling material comprises gelatin.

4. The method of claim 1, wherein the filling material has a different thickness than the bistable material.

5. The method of claim 1, wherein the bistable material comprises one or more of an electrochemical material, an electrophoretic material, an electrochromic material, a magnetic material, a ferroelectric material, a nematic liquid crystal material, or a chiral nematic liquid crystal material.

6. The method of claim 1, wherein the bistable material comprises one or more of a nematic liquid crystal material, or a chiral nematic liquid crystal material.

7. The method of claim 1, wherein forming an imagewise pattern in the layer of bistable material comprises applying a first amount of energy in an imagewise pattern to the layer of bistable material to form the pattern, wherein the pattern is permanent and hideable.

8. The method of claim 7, wherein the energy is in the form of light, heat, or radiation.

9. The method of claim 8, further comprising administering an electric field with the first amount of energy to form an imagewise pattern.

10. The method of claim 8, wherein the energy is light.

11. The method of claim 8, further comprising applying the energy in an imagewise pattern through a mask.

12. The method of claim 7, further comprising hiding the permanent hideable mark by applying a second amount of energy to the display such that the layer of bistable material achieves a uniform appearance.

13. The method of claim 12, further comprising revealing the permanent hideable mark by applying a third amount of energy to the display such that the layer of bistable material achieves a non-uniform appearance wherein the imagewise pattern is viewable.

14. A method of forming a permanent hideable mark on a bistable display, comprising:
   forming a bistable display comprising a substrate and a layer of bistable material on the substrate; and
   forming an imagewise pattern in the layer of bistable material by applying a first amount of energy in an imagewise pattern to the layer of bistable material to form the pattern, such that the imagewise pattern is viewable in a first state of the bistable material, hidden in a second state of the bistable material, and is not erasable, wherein the energy is heat wherein the filling material comprises a second bistable material.

15. The method of claim 14, wherein the heat is supplied imagewise by a thermal printhead or laser.

16. The method of claim 14, wherein the filling material comprises the bistable material and the second bistable material, wherein the second bistable material is different from the bistable material.

* * * * *